Feb. 15, 1966   R. P. VIZENOR   3,234,864
OPTICAL MEASURING APPARATUS
Filed Dec. 18, 1963   2 Sheets-Sheet 1

INVENTOR.
RICHARD P. VIZENOR
BY
Roger W. Jensen
ATTORNEY nited States Patent Office 3,234,864
Patented Feb. 15, 1966

3,234,864
OPTICAL MEASURING APPARATUS
Richard P. Vizenor, Minneapolis, Minn., assignor to Honeywell Inc., a corporation of Delaware
Filed Dec. 18, 1963, Ser. No. 331,544
6 Claims. (Cl. 95—1.1)

The present invention relates to apparatus and methods for determining the orientation of a reference mirror with true north and more particularly for determining the orientation of a reference mirror with true north by utilizing some recording means such as photographic plates.

In many applications such as test piers for mounting rate tables utilized to test gyros and the like and at hard mounted missile sites it is necessary to know true north extremely accurately. For these types of operations a large concrete slab or base is generally mounted in the earth for a minimum of outside disturbances. A reference mirror which is accurately positioned with respect to true north, is fixedly mounted to this concrete slab for use in all alignment and test procedures. Because of movement of the test slab the reference mirror must be periodically checked to determine its orientation with respect to true north. At present the true north reference is attained manually by two or more observers taking a series of at least 60 star observations that are related to time and require the use of a computer for the final result. These observations are taken in the following manner. Utilizing a theodolite the observer first finds the North Star and notes the exact time of acquisition. He then swings the theodolite through an approximately 45° arc, exactly vertical, and observes the reference mirror, noting the amount he is displaced in azimuth from the true perpendicular to the mirror. By utilizing 60 such readings the apparent arcuate path of the North Star about true north is computed. From this arcuate path true north is computed and the displacement of the perpendicular to the reference mirror from true north is found. This is a very time consuming and tedious chore and any movement of the reference mirror during this procedure increases the uncertainty of data obtained.

The present invention utilizes a recording means, such as a photographic plate, to simultaneously make a record of all the information necessary to find true north and the perpendicular to the reference mirror. The orientation of the reference mirror with respect to true north can then be obtained by simple measurements on the photographic plate. To produce all of the necessary information on the photographic plate several different sources of information are utilized simultaneously.

The first source of information is a lamp which produces a first image (this image is in the form of a cross) at one side of the recording surface of a photographic plate. Part of the light of the image is transmitted through a half-silvered mirror which allows the image to be recorded on the surface of a photographic plate mounted directly thereunder while simultaneously reflecting part of the light through a telescope, or other lens system, onto a prism. The prism, after several reflections, directs part of the light onto the north reference mirror. The north reference mirror reflects the light at some angle back onto the prism from which it is reflected into the lens system and onto the photographic plate to provide a second image on the opposite side of the recording surface of the photographic plate from the first image. At this time it should be noted that a point halfway between the two images on the surface of the photographic plate will define the true perpendicular to the reference mirror. This can be seen more clearly if a line is drawn from the point equidistant between the two images to the point on the reference mirror at which the light was reflected. This line will bisect the combined angle of incidence and angle of reflectance and be the true perpendicular to the reference mirror.

A second source of information on the photographic plate comes from starlight also received by the lens system and focused onto the surface of the photographic plate between the two images previously described. If the photographic plate is exposed to starlight for a definite period of time the stars appear to follow arcuate paths the center of which is located at the true north. If an instantaneous picture is taken of known stars true north can also be found on the photographic plate by simple measurements involving the relative positions of three strategically predetermined stars. Once the star and the time are known the exact position of the star can be found from star charts. Once true north is located on the photographic plate the displacement of the perpendicular to the reference mirror from true north is measured by measuring the displacement of the point equidistant between the two images along a straight line connecting the two images and the center of the arcuate paths.

A third source of information on the photographic plate is utilized to insure that the above described apparatus is aligned approximately correctly. A mercury pool, utilized as a vertical sensor, is fixedly attached to the concrete slab. The portion of the light received by the prism previously described which is not directed by the prism to the reference mirror is directed to the surface of the mercury pool. This is accomplished by having a half-silvered side in the prism. When the apparatus is correctly aligned an image will be reflected from the mercury pool which will be superimposed over the second image on the photographic plate which is reflected from the reference mirror. In the actual operation of the device an eyepiece may be placed in the lens system before the photographic plate is placed therein. An observer then looks into the eyepiece and sees the two superimposed images as well as the North Star and several surrounding stars. Any adjustments to the alignment of the apparatus are made by the observer before replacing the eyepiece with the photographic plate.

It is an object of the present invention to provide an improved control apparatus.

It is another object of the present invention to provide improved apparatus for determining the orientation of a reference mirror with reference to true north.

It is another object of the present invention to provide improved methods for determining the orientation of a reference mirror with reference to true north.

These and other objects of the invention will be understood more clearly and fully from the following detailed description and accompanying drawings in which.

Figure 1:
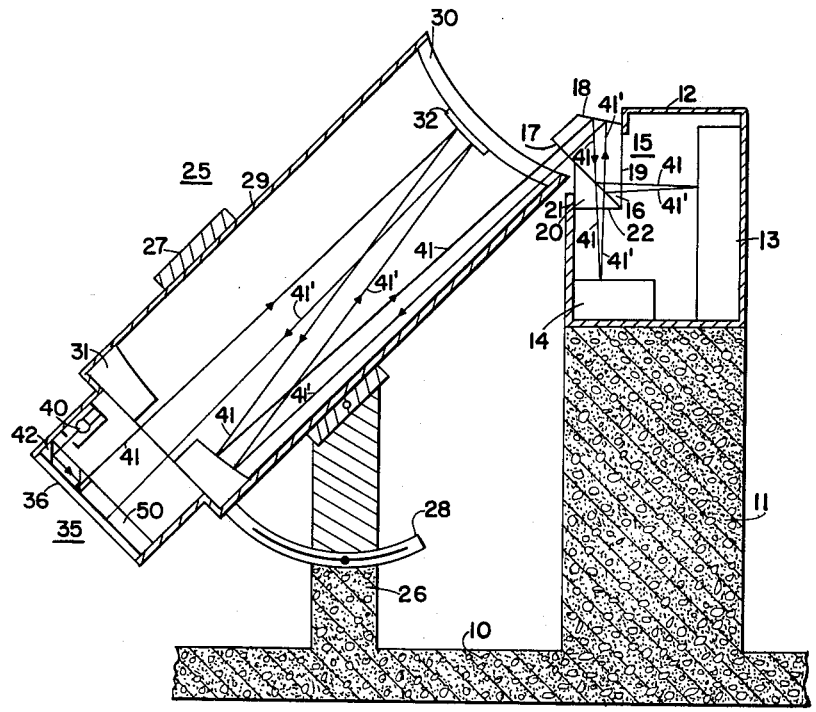
FIGURE 1 is a somewhat schematic view of the present invention.

In FIGURE 1 the numeral 10 designates a base means which in this embodiment is a concrete slab. Fixedly mounted on the base means 10 by means of a concrete pillar 11 is a boxlike container 12. Container 12 has fixedly mounted therein a north reference mirror 13, a mercury pool 14 and a prism assembly 15. Prism assembly 15 is constructed of two prisms 16 and 20. The main prism 16 has a truncated wedge shape. The base 17 of the truncated wedge shaped prism 16 is half-silvered for partial reflectance and partial transmittance. The truncated portion, or side 18, of the prism 16 is cut at an angle such that any light entering through base 17 will be reflected at an angle from the truncated portion 18 back onto the base 17. The truncated wedge shaped prism 16 of prism assembly 15 is mounted within the container 12 by means of a second prism 20 of prism assembly 15. Prism 20 is wedge shaped with a base having an area approximately one half the area of the base of prism 16 and two sides 21 and 22 approximately equal and forming a right angle with each other. The base of the prism 20 is firmly affixed to the base of the prism 16 by some means such as gluing and the side designated 21 of prism 20 is firmly affixed to an inside surface of container 12 by some means such as gluing. Since prism 20 is a right angle wedge and side 21 of prism 20 is parallel and in juxtaposition with the side of container 12 the side 22 of prism 20 is parallel with the base means 10, or horizontal. In this manner prism assembly 15 is firmly mounted so that approximately one half of the base 17 of prism 16 protrudes through an opening in container 12 and lies in a plane which froms an angle with the horizontal or the base means 10. The truncated portion 18 of the prism 16 is facing an upward direction and also is on the exterior of container 12. One side 19 of prism 16 is perpendicular to the base means 10 and completely within the container 12. Prism assembly 15 is so constructed that light entering through the protruding one half of base 17 will be reflected from the truncated side 18 back onto the base 17 at an angle such that one half of the light passes through base 17 and out through the side 22 of prism 20. The other half of the light is reflected from base 17 out through the side 19. The north reference mirror 13 is mounted so that its surface is parallel to the side 19 of the prism assembly 15. The mercury pool 14 is mounted directly below and parallel to the side 22 of prism 20 so that light emitting from the side 22 will be reflected from the surface of the pool back into the side 22.

A lens system 25 is utilized to transmit light to and from prism assembly 15. In this embodiment the lens system 25 consists of a telescope comprising a meniscus corrector 30, a primary reflector 31 and a secondary reflector 32 fixedly attached to the back of the meniscus corrector 30. The corrector 30 and the reflectors 31 and 32 are all disc-shaped lenses mounted by means of a cylindrical housing 29 coaxially along the longitudinal axis of the housing 29. Focal plane optics 35 are mounted in the focal plane of the lens system 25 previously described and form one end of the housing 29. The focal plane optics 35 are shown more clearly in FIGURE 2 and explained more fully in conjunction therewith. The housing 29 is mounted on base means 10 by means of a second concrete column 26. A collar 27 encircles the housing 29 of the telescope 25 and is firmly attached thereto by screws or other means. The collar 27 is adjustably connected to pillar 26 by means of an adjustable connecting device 28. Adjustable connecting device 28 may be any device which will allow the angle between the longitudinal axis of the lens system 25 and the surface of the base means 10 to be varied.

Figure 2:
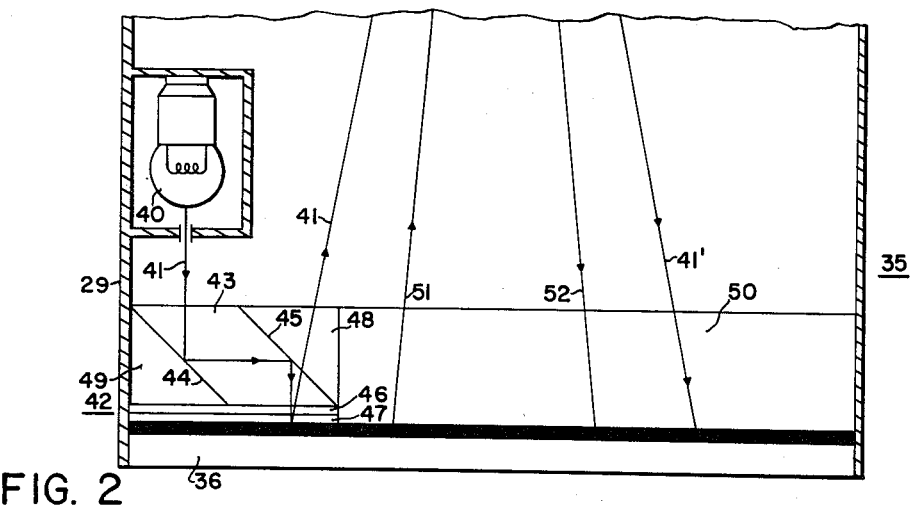
FIGURE 2 is an enlarged schematic view of the focal plane optics.

An enlarged view of the focal plane optics 35 is shown in FIGURE 2. A recording means, which in the present embodiment is a photographic plate 36, mounted in the focal plane of the telescope is utilized to make a record of all light impinging thereon. A light source 40 provides a beam of light, illustrated by line 41, which is transmitted to the photographic plate 36 by means of a prism assembly 42. Prism assembly 42 may be any combination of prisms which will transmit a beam of light from the source 40 to the desired area on the photographic plate 36. In the present embodiment prism assembly 42 consists of a rhomboidal shaped parallelepiped 43 having one side 44 with a fully reflective coating and the opposite parallel side 45 having a one half-silvered coating for partial reflectance and partial transmittance. A right angle wedge shaped transparent prism having a base with an area equal to the area of the side 45 of prism 43 and glued onto side 45 is utilized to improve the light transmitting characteristics of the prism assembly 42. A second right angle wedge shaped prism 49 equal in size to prism 48 is glued by its base onto side 44 of prism 43 and utilized as a mounting means therefor.

Parallel to the bottom of the prism assembly 42, and attached thereto by some means such as gluing, is a reticle 46. Reticle 46 is an opaque plate having a transparent pattern therethrough. In the present embodiment the transparent pattern consists of a cross. Attached by some means such as gluing to the bottom of the reticle and parallel thereto is a partially reflecting plate 47. The partially reflecting plate 47 may be a simple glass plate having an aluminum coating thereon which allows a portion of the light passing through the reticle 46 to pass through the plate 47 and a portion of the light to be reflected back through the reticle 46. The prism assembly 42, the reticle 46 and the partially reflecting plate 47 are mounted in juxtaposition to and parallel with the extreme left-hand edge of the photographic plate 36 but are not connected thereto.

The light source 40 is mounted to the housing 29 above the prism assembly 42 and masked so that light travels from the source only along the line 41 to the prism assembly 42. The light is fully reflected from the side 44 of the prism 43 and is transmitted to the parallel side 45 of prism 43. Side 45 reflects the light downward through the reticle 46 to the partially reflecting plate 47. The partially reflecting plate 47 allows part of the light to impinge upon the photographic plate and reflects part of the light back through the reticle 46. The light passing back through the reticle 46 passes through the prism 48 half reflecting side 45 of prism 43, through the prism 48 and into the lens system 25. The prism assembly 42, reticle 46 and partially reflecting plate 47 are connected together as described and mounted to the housing 29 of the lens system 25 by some means such as screws or gluing. The photographic plate 36 is separate from this assembly so that it may be changed each time it is used.

A rectangular parallelepiped prism 50 is mounted above the extreme right-hand edge of the photographic plate 36, but not connected thereto, and utilized as a compensator plate. The prism 50 is mounted to the side 29 of lens system 25 by some means such as gluing and receives the light from the prism assembly 42 after it has passed through the lens system and has been reflected from the north reference mirror, as will be explained later. The line 41 is utilized to indicate the path of the light leaving the prism assembly 42 and passing into the lens system 25. The line 41' indicates the path of the light returning from the lens system 25 to the compensator plate 50. Since it is desirable that the path 41' be of the same length as the path 41 the compensator plate 50 is utilized to increase the length of the path 41' to compensate for the increase in length of the path 41 caused by the prism assembly 42. The light following path 41' passes through the prism 50 and impinges upon the photographic plate 36 on the right-hand side of FIGURE 2. Lines 51 and 52 are representative of light from the stars being transmitted through the lens system 25 to the photographic plate 36.

Referring to FIGURE 1 the light source 40 produces a beam of light which follows the path indicated by the line 41 and is transmitted by the prism assembly 42, through the reticle 46 and the reflecting plate 47 to the photographic plate 36. A portion of the light is reflected by the reflecting plate 47 back through the reticle 46 and is transmitted by the prism assembly 42 into the lens system 25. The beam of light following the path 41 is reflected from the secondary reflector 32 onto the primary reflector 31. The primary reflecting lens 31 reflects the light through the meniscus lens 30 and through side 17 of the prism assembly 15. The light is reflected from the side 18 of the prism assembly 15 back onto the side 17 where a portion of it is reflected out through side 19 to the north reference mirror 13. A portion of the light passes through the partially silvered surface of side 17 and is transmitted by the wedge shaped prism 20 of prism assembly 15 to the surface of the mercury pool 14. The north reference mirror 13 and the mercury pool 14 both reflect the beams of light back along paths which are indicated by the lines 41'. When the apparatus is correctly aligned, as is assumed in FIGURE 1, the beam of light reflected by the north reference mirror 13 and the beam of light reflected by the mercury pool 14 will combine at the surface 17 of the prism assembly 15 to form a sinble beam of light. Thus, the same numeral is used to designate the paths of both beams in FIGURE 1 to simplify the drawing.

After the beams of light from the mercury pool 14 and the north reference mirror 13 combine at the surface 17 they pass through the prism 16 of the prism assembly 15 to the side 18 where they are reflected back through the side 17 and into the lens system 25 by way of the meniscus lens 30. The beam of light following the path 41' is reflected from the primary mirror 31 onto the secondary mirror 32 where it is reflected back to the prism 50 which transmits it to the photographic plate 36. Thus, a cross of light will impinge upon the photographic plate at the left-hand side and the reflected image of this cross of light will be reflected from the north reference mirror 13 and the mercury pool 14 to appear as a second cross of light on the photographic plate at the right-hand side. The photographic plate may be seen more clearly in FIGURE 3.

Figure 3:
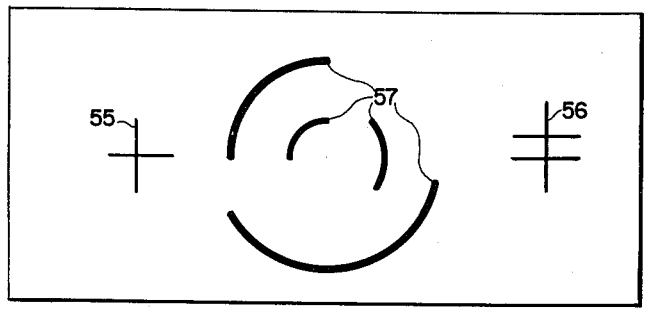
FIGURE 3 is a view of a processed photographic plate after approximately six hours exposure in the apparatus of the present invention.

FIGURE 3 illustrates a typical developed photographic plate after a six hour exposure in the disclosed apparatus. A cross 55 at the left-hand side of the plate illustrates the light from the light source 40 passing through the prism assembly 42, reticle 46 and partially reflecting plate 47. The cross 56 at the right-hand side of the plate illustrates the reflected light returning from the reference mirror 13 and the mercury pool 14 through the compensator plate 50. In FIGURE 3 the cross 56 has two parallel arms the lower one indicating the reflected image from the north reference mirror 13 and the upper one indicating the reflected image from the mercury pool 14. The double parallel arms on the cross 56 indicate a slight misalignment of the lens system 25. When the image reflected from the north reference mirror 13 and the mercury pool 14 are approximately coincident on the photographic plate the apparatus is correctly aligned. It should be noted that a slight misalignment as indicated by the parallel arms of cross 56 would not appreciably affect the accuracy of the apparatus since all of the required information would still be on the photographic plate. Several arcuate traces 57 are illustrated approximately midway between cross 55 and cross 56 on the photographic plate in FIGURE 3. The arcuate traces 57 are produced by starlight which is focused onto the photographic plate by the lens system 25.

In the operation of the present apparatus an observer first replaces the photographic plate 36 with an eyepiece, not shown. By looking through the eyepiece and adjusting the mounting mechanism 28 until the cross 56 has a single horizontal arm of approximately the correct length the observer can correctly align the present apparatus for operation. Once the apparatus is correctly aligned and locked into place the eyepiece can be replaced with a photographic plate. After approximately a six hour exposure the stars will appear as long arcuate traces 57 (shown in FIGURE 3) rather than point sources. The center of these arcuate traces is true north or the north celestial pole. It should be noted that the stars appear to follow concentric paths about the north celestial pole due to the earth's rotation on its axis. The present invention could be utilized to locate south by using the south celestial pole also, however, since the greatest use of this device will be in the northern hemisphere the north celestial pole is used as an example in this embodiment.

Once the photographic plate is developed and a pattern such as shown in FIGURE 3 is obtained true north can be located by finding the center of the concentric arcuate paths 57. The perpendicular to the north reference mirror 13 can also be found by locating a point equidistant between the cross 55 and the cross 56 along a straight line joining the two crosses. Since the cross 56 is a reflection of the cross 55 from the north reference mirror 13 a point half-way between the two must determine the perpendicular to the north reference mirror 13. By measuring the distance between the center of the arcuate star trails 57, which is true north, and the point equidistant between the cross 55 and the cross 56, which determines the perpendicular to the north reference mirror 13, the orientation of the north reference mirror 13 with respect to true north can be determined. For example, if the two points just described are exactly coincident the north reference mirror 13 is exactly perpendicular to true north.

Figure 4:
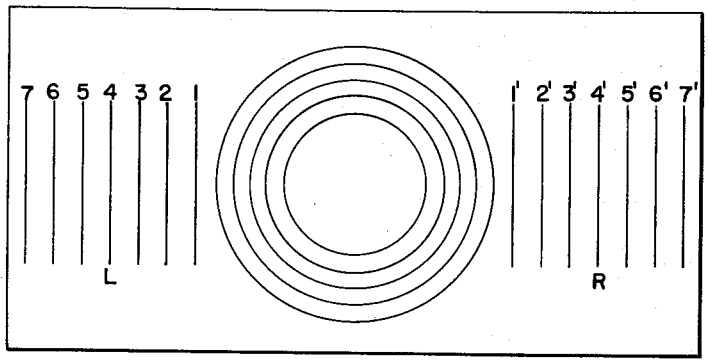
FIGURE 4 is a diagram of an engraved reticle pattern.
Figure 5:
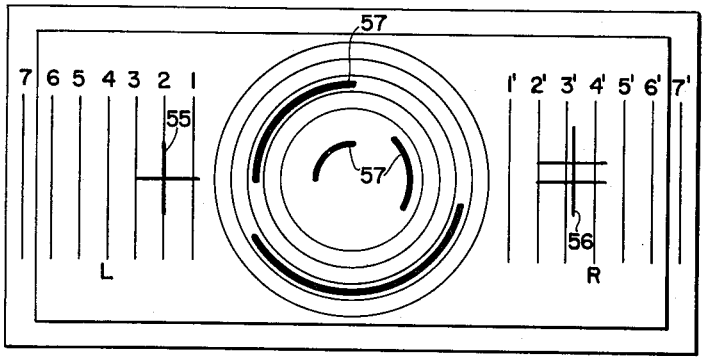
FIGURE 5 is a view of the reticle in FIGURE 4 superimposed on the photographic plate of FIGURE 3.

FIGURE 4 illustrates a possible overlay that may be utilized to make the measurements from the photographic plate to determine the orientation of the reference mirror. The overlay in FIGURE 4 has a group of concentric rings inscribed approximately at the the center thereof and seven vertical parallel lines marked 1–7, to the left of the concentric rings. The lines 1–7 are inscribed at equal intervals which may be any value but which must be taken into account in calculations to be described later. These lines are marked with an L to indicate that they are to the left. To the right of the concentric rings are seven vertical parallel lines marked 1'–7' and designated with an R to indicate they are to the right. The lines 1'–7' have intervals therebetween equal to the intervals between lines 1–7. The lines marked L are inscribed on the overlay at exactly the same distance from the center of the concentric rings as the lines marked R. That is to say the lines 1 and 1' are equidistant from the center and parallel, the lines 2 and 2' are equidistant from the center and parallel, etc. In the actual measurement the overlay shown in FIGURE 4 is placed on the photographic plate, an example of which is shown in FIGURE 3, so that the concentric rings inscribed in the center of the overlay are concentric with the star trails in the center of the photographic plate, as shown in FIGURE 5. The distance from the cross 55 at the left from the nearest vertical line L is measured and the distance of the cross 56 at the right from the nearest vertical line R is measured. The final angle in arc seconds, between the perpendicular to the north reference mirror 13 and true north, is computed from the following formula:

$$A = \tfrac{1}{2}(.006)(L-R)1428.6 = 4.2858(L-R)$$

Where A equals the angle in arc seconds the normal of the north reference mirror 13 is off true north, L equals the approximate position of the cross 55 in terms of the left vertical lines and R equals the approximate position of the cross 56 in terms of the right vertical lines. 1428.6 is the conversion factor obtained from the focal length of the optical system and also has a factor therein allowing for the interval between the vertical lines. In this example the lens system has a focal length of 138 inches and .0007 inch on the overlay of FIGURE 4 represents one second of arc. In FIGURE 5 the cross 53 falls on the number 2 vertical line and L in the above formula would therefore be 2. The cross 56 falls between the vertical lines 3' and 4' at approximately 3.3 and therefore R would be 3.3. The angle A in arc seconds of the normal of the reference mirror 13 to true north in this particular orientation would be −5.57 arc seconds. The plus or the minus in the angle indicates which side of true north the prependicular of the reference mirror 13 is pointing.

Because the relative position of the stars, with respect to each other, is a constant, two or more stars could be used to align the overlay using information previously obtained directly from the stars and from star tables which are well known in the art. This can be done simply by knowing the stars and the approximate time and date at which the photograph is taken. Then, rather than waiting six hours for an exposure to produce arcuate paths for the starlight the photograph could be taken in approximately 15 seconds and the overlay could be placed over the stars in the proper position. The proper position is determined as described above from the information obtained directly from the stars and from various well known star tables. The same formula explained above could be utilized to determine the angle in arc seconds the normal of the north reference mirror 13 is off true north once the overlay is in place and the measurement of the crosses from the vertical lines is made.

Thus, an apparatus and methods of use thereof has been disclosed which greatly simplifies the determination of the orientation of a reference mirror with respect to true north. Also, because there is no human error involved in the measurements of times and angles the final answer will be more accurate than can be obtained by the manual method.

While I have shown and described a specific embodiment of this invention, the invention should not be limited to the particular form shown and I intend in the appended claims to cover all modifications which do not depart from the spirit and scope of this invention.

What is claimed is:

1. Apparatus for determining the orientation of a reference mirror with reference to true north comprising:
   (a) a north reference mirror orientated approximately perpendicular to true north;
   (b) recording means having a flat surface for providing a permanent record of any light impinging upon said flat surface, said recording means having semi-reflecting characteristics;
   (c) optical means for optically connecting said north reference mirror to said flat surface of said recording means and for receiving starlight and focusing said starlight onto said flat surface, said starlight following arcuate paths on said flat surface over a definite period of time;
   (d) light producing means; and
   (e) means for transmitting a beam of light from said light producing means onto said flat surface of said recording means in a manner to produce a first image on said flat surface, said recording means partially reflecting said first image through said optical means onto said north reference mirror and said north reference mirror reflecting said first image back through said optical means onto said flat surface to produce a second image on said flat surface displaced from said first image, the perpendicular to said north reference mirror being indicated by a point on said flat surface equidistant between said first and second images on a straight line connecting said images and true north being indicated by the center of the arcuate paths produced by the incident starlight on said flat surface.

2. Apparatus for determining the orientation of a reference mirror with reference to true north comprising:
   (a) a reference mirror;
   (b) recording means having a flat surface for providing a permanent record of any light impinging upon said flat surface, said recording means having semi-reflecting characteristics;
   (c) optical means for optically connecting said reference mirror to said flat surface of said recording means and for receiving starlight and focusing said starlight onto said flat surface, said starlight following arcuate paths on said flat surface over a definite period of time;
   (d) light producing means;
   (e) means for transmitting a beam of light from said light producing means onto said flat surface of said recording means in a manner to produce a first image on said flat surface, said recording means partially reflecting said first image through said optical means onto said reference mirror and said reference mirror reflecting said first image back through said optical means onto said flat surface to produce a second image on said flat surface displaced from said first image, the perpendicular to said reference mirror being indicated by a point on said flat surface equidistant between said first and second images on a straight line connecting said images and true north being indicated by the center of the arcuate paths produced by the incident starlight on said flat surface;
   (f) vertical sensing means; and
   (g) means optically connecting said vertical sensing means to said recording means for providing an indication of the orientation with relation to the vertical of said apparatus.

3. Apparatus for determining the orientation of a reference mirror with reference to true north comprising:
   (a) base means;
   (b) a north reference mirror fixedly mounted on said base means approximately perpendicular to true north;
   (c) recording means having a flat surface for providing a permanent record of any light impinging upon said flat surface, said recording means having semi-reflecting characteristics;
   (d) optical means adjustably mounted on said base means for optically connecting said north reference mirror to said flat surface of said recording means and for receiving starlight and focusing said starlight onto said flat surface, said starlight following arcuate paths on said flat surface over a definite period of time;
   (e) light producing means; and
   (f) means for transmitting a beam of light from said light producing means onto said flat surface of said recording means in a manner to produce a first image on said flat surface, said recording means partially reflecting said first image through said optical means onto said north reference mirror and said north reference mirror reflecting said first image back through said optical means onto said flat surface to produce a second image on said flat surface displaced from said first image, the perpendicular to said north reference mirror being indicated by a point on the flat surface equidistant between said first and second images on a straight line connecting said image and true north being indicated by the center of the arcuate paths produced by the incident starlight on said flat surface.

4. Apparatus for determining the orientation of a reference mirror with reference to true north comprising:
   (a) base means;
   (b) a reference mirror fixedly mounted on said base means;
   (c) recording means having a flat surface for providing a permanent record of any light impinging upon said flat surface, said recording means having semi-reflecting characteristics;
   (d) optical means adjustably mounted on said base means for optically connecting said reference mirror to said flat surface of said recording means and for receiving starlight and focusing said starlight onto said flat surface, said starlight following arcuate paths on said flat surface over a definite period of time;

(e) light producing means;
(f) means for transmitting a beam of light from said light producing means onto said flat surface of said recording means in a manner to produce a first image on said flat surface, said recording means partially reflecting said first image through said optical means onto said reference mirror and said reference mirror reflecting said first image back through said optical means onto said flat surface to produce a second image on said flat surface displaced from said first image, the perpendicular to said reference mirror being indicated by a point on the flat surface equidistant between said first and second images on a straight line connecting said images and true north being indicated by the center of the arcuate paths produced by the incident starlight on said flat surface;
(g) vertical sensing means fixedly mounted on said base means; and
(h) means optically connecting said vertical sensing means to said recording means for providing an indication of the orientation with relation to the vertical of said apparatus.

5. In the determination of the orientation of a reference mirror with respect to true north, the improvement which comprises a method of comparing the displacement of the perpendicular of the reference mirror from true north on a photographic plate, said method including:
(a) aligning an optical system so that stars adjacent the north celestial pole, a reflection from said reference mirror of a light source in said optical system and a reflection from a mercury pool of said light source are simultaneously visible in an eyepiece of said optical system;
(b) replacing said eyepiece with a photographic plate for a definite period of time;
(c) removing and developing said photographic plate, said photographic plate having thereon a first image of the light source, an image of the light source reflected from said reference mirror and displaced from said first image, and arcuate traces of star images;
(d) locating on said photographic plate the center of said arcuate traces of the star images, said center representing true north; and
(e) measuring the displacement from said center of a point on said photographic plate equidistant from said first image of said light source and said reflected image of said light source on a straight line connecting said images of said light source, said displacement indicating the orientation of said reference mirror with respect to true north.

6. In the determination of the orientation of a reference mirror with respect to true north, the improvement which comprises a method of comparing the displacement of the perpendicular of the reference mirror from true north of a permanent record, said method including:
(a) aligning an optical system so that stars adjacent a celestial pole, a reflection from said optical system and a reflection from a mercury pool of said light source are simultaneously visible in an eyepiece of said optical system;
(b) replacing said eyepiece for a definite period of time with a recording means having a flat surface for recording light impinging thereon;
(c) removing said recording means, said flat surface having recorded thereon a first image of the light source, an image of the light source reflected from said reference mirror and displaced from said first image, and arcuate traces of star images;
(d) locating on said flat surface the center of said arcuate traces of the star images, said center representing the celestial pole; and
(e) measuring the displacement from said center of a point on said flat surface equidistant from said first image of said light source and said reflected image of said light source on a straight line connecting said images of said light source, said displacement indicating the orientation of said reference mirror with respect to true north.

References Cited by the Examiner
UNITED STATES PATENTS
3,080,801   3/1963   Merritt _____ 95—1.1

JOHN M. HORAN, *Primary Examiner.*